UNITED STATES PATENT OFFICE.

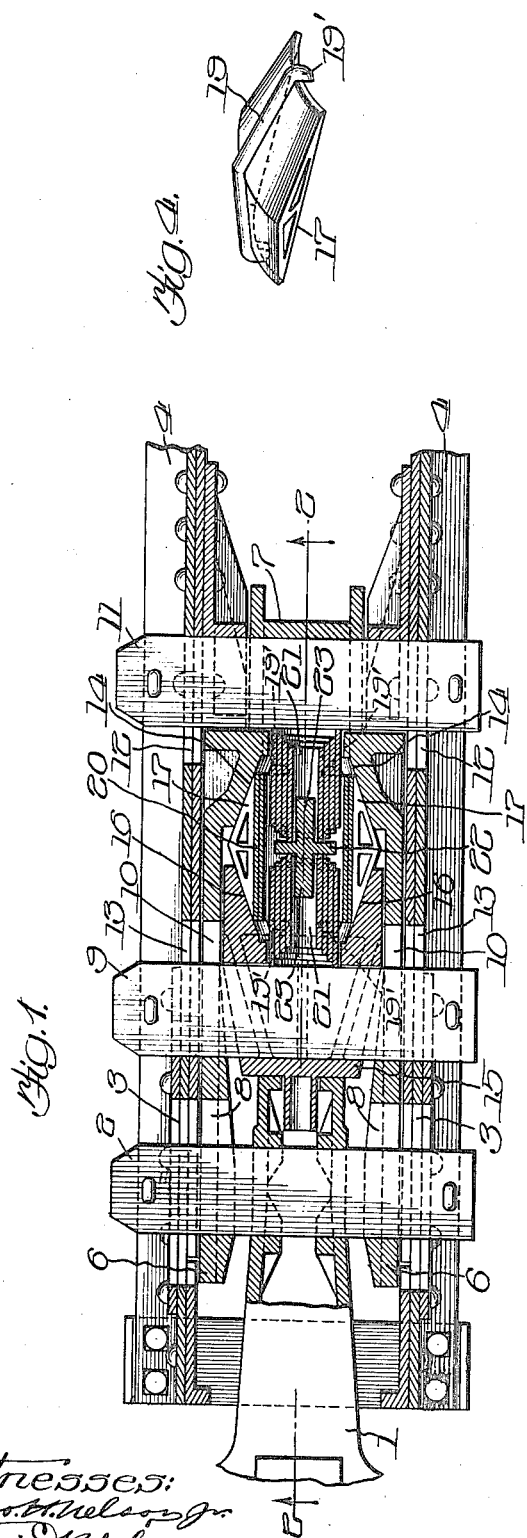

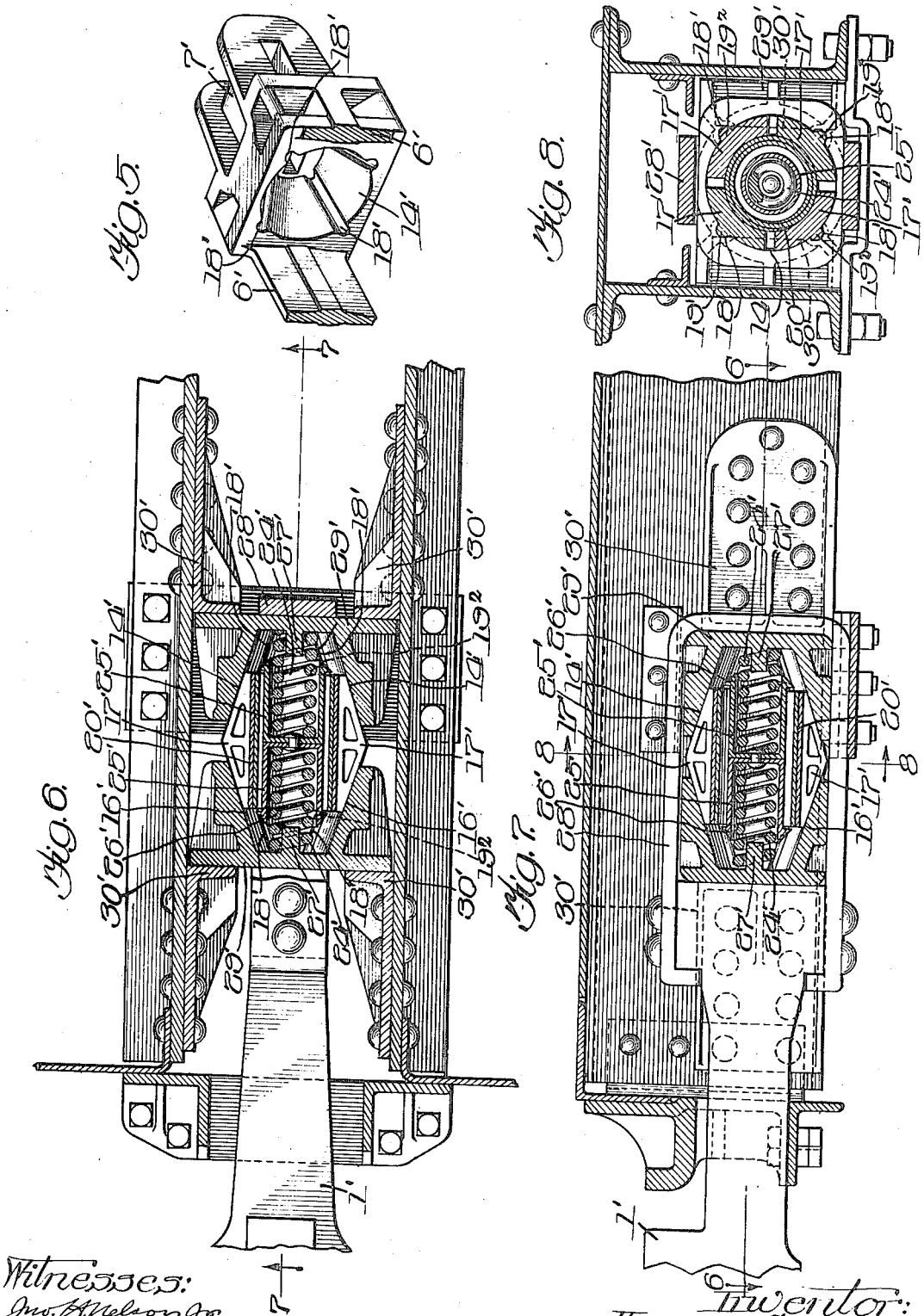

HERMAN C. PRIEBE, OF BLUE ISLAND, ILLINOIS.

FRICTION DRAFT-GEAR.

1,063,213.  Specification of Letters Patent.  Patented June 3, 1913.

Application filed November 27, 1912. Serial No. 733,826.

*To all whom it may concern:*

Be it known that I, HERMAN C. PRIEBE, a citizen of the United States, residing at Blue Island, in the county of Cook and State of Illinois, have invented a certain new and useful Improvement in Friction Draft-Gear, of which the following is a full, clear, concise, and exact description, reference being had to the acompanying drawings, forming a part of this specification.

My invention relates to friction draft gears employed for joining cars in a train and, in one of its embodiments, it includes a coupler stem, a sheet of spring metal wound spirally into the form of a cylinder with overlapping layers thereof in frictional engagement, this cylinder being so disposed as to have its bore substantially horizontal and substantially longitudinal of the line of draft of the gear, and cylinder contracting mechanism subject to draft strains and operable by draft strains of sufficient strength to contract said cylinder to produce friction.

The invention in another of its embodiments includes, as a part of the friction producing means, alined volute springs and mechanism for preserving the alinement of these springs so that the coils of each will not ride over the coils of the other.

My invention has other objects and advantages which will fully appear in connection with the accompanying drawings showing the preferred embodiments thereof and in which drawings—

Figure 1 is a sectional plan view of one form of draft gear constructed in accordance with the invention; Fig. 2 is a sectional view on line 2 2 of Fig. 1; Fig. 3 is a sectional view on line 3 3 of Fig. 2; Fig. 4 is a perspective view of a part of the structure illustrated in Figs. 1, 2 and 3 and which element also is included in the other embodiment of the invention illustrated; Fig. 5 is a perspective view of a structural part illustrated in Figs. 1, 2 and 3; Fig. 6 is a sectional plan view of another form of the invention; Fig. 7 is a sectional view on line 7 7 of Fig. 6; and Fig. 8 is a sectional view on line 8 8 of Fig. 7.

Like parts are indicated by similar characters of reference throughout the different figures.

The friction draft gear shown in Figs. 1 to 3 inclusive includes a coupler having a shank 1 in normally fixed relation with respect to the key 2 which for the purpose may be passed through a slot in the shank. This key is capable of movement from its normal position either forward or backward accordingly as the coupler shank is pulled or pushed, the key passing through slots 3 in center sills 4 that constitute the preferred form of draft gear support, this support being connected with the car or other vehicle body. The coupler yoke includes two side members 6 that are preferably joined by an integral end wall or connection 7, though the invention is not to be limited to this characteristic. The free ends of the coupler yoke are provided with slots 8 at the forward ends of which the key plate 2 is normally positioned. A key plate 9 is normally in engagement with the forward sides of the slots 10 in the coupler yoke and the key 11 is in fixed relation with the coupler yoke. The key plate 11 passes through slots 12 in the center sills which are sufficiently elongated to permit the key plate to move forwardly and the key plate 9 passes through slots 13 in the center sills to permit this key plate to move rearwardly. The rear end of the yoke structure 7, 8 is formed with a conically shaped seat 14 while the key plate 9 passes through a horizontal slot provided in a block 15 having a conically shaped seat 16.

The seats 14 and 16 are co-axial and disposed horizontally longitudinally of the line of draft, each flaring toward the other. A plurality of wedging elements are preferably entered within each conical seat 14, 16, these wedging elements being desirably formed in pairs, the members of each pair being preferably made in one integral casing as indicated at 17. There are preferably four structures 17 distributed about the axis of the gear and sufficient spacing intervenes between adjacent elements 17 as to permit the adjacent faces of the seats or pockets 14 and 16 to be brought together, when the gear is under sufficient strain, without occasioning forcible engagement between the elements 17.

The seats or pockets 14, 16 are desirably provided with grooves 18 located in planes that include the longitudinal axis of the gear and receiving ribs 19 provided upon the wedging elements 17 so that these wedging elements are not likely to become twisted as they move in their seats and also to preserve them in proper relative positions. The wedging elements 17 are employed to operate a suitable friction producing device and, in the preferred form of my invention, this friction producing device is constructed of a sheet of spring steel wound spirally into the form of a cylinder 20 placed to have its bore horizontal and longitudinal of the gear and the car having the gear with the overlapping layers thereof in frictional contact, expansion of the spring laterally of the longitudinal axis of the gear being such as to keep the wedging blocks 17 in their farthest positions permitted by the pockets 14 and 16 irrespective of the degree of separation of said pockets. When the coupler yoke is subjected to a sufficient pull the pocket 14 is moved forwardly to cause the wedge blocks 17 mutually to approach thereby to reduce the diameter of the cylinder 20, friction being produced between the overlapping layers of the spring cylinder as the diameter of this cylinder is reduced and also between the exterior surface of the cylinder and the wedging blocks 17. Friction is also produced between the blocks 17 and both pockets 14 and 16 as the wedging elements 17 are caused mutually to approach since the wedging elements 17 are, in the operation being described, projected within the pocket 16. When the coupler yoke is sufficiently relieved of its pull the spring cylinder 20 will expand owing to its own resilience and in expanding will thrust the wedging elements 17 apart to the extent which is permitted by the pockets 14 and 16 in separating. When the coupler yoke is subjected to a sufficient push the key plate 9 is moved to the rear to push the pocket 16 toward the pocket 14 whereupon the steel spring cylinder 20 and the wedging devices 17 operate in the manner before described excepting that the wedging elements 17 are forced by the pocket 16 into the pocket 14. The ribs 19 are desirably continued over the ends of the wedging elements 17 so as to form hooks $19^1$ that engage the ends of the spring cylinder 20 so as to maintain coöperative relation between the spring cylinder 20 and the wedging blocks 17 irrespective of the position of the wedging blocks. Volute friction producing springs 21 may be disposed longitudinally of the gear and are engaged by the key plates 9 and 11, respectively, a floating separating plate 22 being disposed between adjacent ends of the alined volute springs to prevent the coils of one from riding upon the coils of the other. The plate 22 is desirably positioned by being provided with central lugs 23 upon opposite sides of the plate, these central lugs entering the bores of the alined volute springs 21 to maintain these springs in alinement.

The structure illustrated in Figs. 6, 7 and 8 dispenses with the volute springs 21 and uses the alined coiled springs $24^1$ instead. These alined springs $24^1$ enter abutting spring barrels $25^1$ that are provided with outwardly extending hooks $26^1$ to engage the ends of the spring cylinder $20^1$ whereby the spring barrels are maintained in central position with respect to the element $20^1$. In the structures of Figs. 6, 7 and 8 there are included the pocketed members $14^1$ and $16^1$ and the wedging elements $17^1$ which coöperate with each other and with the spring cylinder $20^1$ as described in connection with Figs. 1 to 5, inclusive, the wedging element $17^1$ being of the form shown in Fig. 4 while the seat portions of the pocketed elements $14^1$ and $16^1$ are similar in construction to the correspondingly designated parts in Figs. 1 to 5, inclusive, excepting that in the structure of Figs. 6, 7 and 8 the bases of the pockets $14^1$ and $16^1$ are provided with mutually approached lugs $27^1$ that enter the bores of the springs $24^1$. In the structure of Figs. 6 to 8, inclusive, the coupler shank $1^1$ is provided with the commoner type of coupler yoke $28^1$ in the form of a simple strap, illustrated most clearly in Fig. 7, and when such a form of coupler yoke is employed the pocketed portions $14^1$ and $16^1$ are provided with follower plate bases $29^1$ which engage the vertical sides or ends of the coupler yoke (Fig. 7) when there is insufficient pulling or pushing strain to cause the approach of one pocketed element toward the other, the follower plate portions $29^1$ then being in engagement with cheek plates $30^1$ mounted upon the center sills so that either follower plate is held in fixed relation with the center sills when the other is to be forced toward the same upon sufficient increase in pulling or buffing strains as the case may be. The seats or pockets $14^1$, $16^1$ are desirably provided with grooves $18^1$ located in planes that include the longitudinal axis of the gear and receiving the ribs $19^2$ provided upon the wedging elements $17^1$ so that these wedging elements are not likely to become twisted as they move in their seats and also to preserve them in proper relative positions. The ribs $19^2$ are desirably continued over the ends of the wedging elements $17^1$ so as to form hooks similar to the hooks $19^1$ of Figs. 1 to 4 that engage the ends of the spring cylinder $20^1$ so as to maintain coöperative relation between the spring cylinder $20^1$ and the wedging blocks $17^1$ irrespective of the position of the wedging block.

In view of the description which has been given in connection with the structure shown by Figs. 1 to 5, inclusive, further description of the structure shown in Figs. 6 to 8, inclusive, will not be required as similarly designated parts have similar functions.

While I have herein shown and particularly described the preferred embodiment of the invention I do not wish to be limited to the precise details of construction shown as changes may readily be made without departing from the spirit thereof, but

Having thus described my invention I claim as new and desire to secure by Letters Patent the following:—

1. A friction draft gear including a coupler stem; a sheet of spring metal wound spirally into the form of a cylinder with overlapping layers thereof in frictional engagement, this cylinder being so disposed as to have its bore substantially horizontal and substantially longitudinal of the line of draft of the gear; and cylinder contracting mechanism subject to draft strains of sufficient strength to contract said cylinder to produce friction, said cylinder contracting mechanism including flaring seats between which said cylinder is disposed and wedging blocks entering said seats and engaging the exterior of said cylinder.

2. A friction draft gear including a coupler stem; substantially co-axial conical seats substantially horizontally disposed longitudinally of the line of draft, one seat being movable toward the other by the stem when subject to sufficient pull and the other seat being movable toward the first mentioned one by the stem when subject to sufficient push; wedging elements entering said seats; and movable therein transversely of the line of draft, and friction producing means operated by the wedging elements.

3. A friction draft gear including a coupler stem; substantially co-axial conical seats substantially horizontally disposed longitudinally of the line of draft, one seat being movable toward the other by the stem when subject to sufficient pull and the other seat being movable toward the first mentioned one by the stem when subject to sufficient push; and spaced apart friction producing means operated by the wedging elements, said seats and wedging elements having interengaging formations to maintain the wedging elements in separated relation.

In witness whereof, I hereunto subscribe my name this 25th day of November A. D., 1912.

HERMAN C. PRIEBE.

Witnesses:
E. L. WHITE,
G. L. CRAGG.